US008516969B2

(12) United States Patent
Wendte et al.

(10) Patent No.: US 8,516,969 B2
(45) Date of Patent: *Aug. 27, 2013

(54) SEED PLANTER INCORPORATING DIRECTLY DRIVEN SEED METER HUB DRIVE

(75) Inventors: Keith Wendte, Willowbrook, IL (US); Brian Adams, Centralia, MO (US)

(73) Assignee: CNH America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,234

(22) Filed: Sep. 6, 2012

(65) Prior Publication Data
US 2012/0325132 A1    Dec. 27, 2012

Related U.S. Application Data

(62) Division of application No. 12/625,218, filed on Nov. 24, 2009, now Pat. No. 8,281,725.

(51) Int. Cl.
*A01C 7/00*    (2006.01)

(52) U.S. Cl.
USPC ............................ 111/185; 111/921; 111/922

(58) Field of Classification Search
USPC ................... 111/170–185, 921, 922
See application file for complete search history.

(56) References Cited

U.S. PATENT DOCUMENTS

| | | | |
|---|---|---|---|
| 6,752,095 | B1 | 6/2004 | Rylander et al. |
| 2003/0029261 | A1 | 2/2003 | DeJonge |
| 2004/0060653 | A1 | 4/2004 | Hebels et al. |
| 2009/0000533 | A1 | 1/2009 | Wendte |
| 2010/0131232 | A1* | 5/2010 | Taylor ........................ 702/147 |

OTHER PUBLICATIONS

"Dispenser Devices Driving and Controlling System", http://www.added-tech.com/content/view/16/16, Nov. 24, 2009, 3 pages.
Mar. 2, 2009 Office Action in U.S. Appl. No. 11/769,400, 6 pages.

* cited by examiner

*Primary Examiner* — Christopher J Novosad
(74) *Attorney, Agent, or Firm* — Rebecca Henkel

(57) ABSTRACT

A direct drive electric seed metering system is provided for use with a row crop planter or seed planter that intakes a volume of multiple seeds from a seed hopper, draws individual seeds from the volume of multiple seeds and discharges them into a seed furrow formed in an agricultural field. The direct drive electric seed metering system includes a meter assembly having a meter housing and a seek disk rotatably mounted concentrically in the housing for singulating the seeds. A direct drive mechanism is mounted to the meter assembly for interfacing and driving the seek disk at an angular velocity which corresponds to the travel velocity of the seed planter. A single seed planter can have multiple direct drive electric seed metering systems, and each of the multiple direct drive electric seed metering systems preferably has its own prime mover to effectuate driving the seek disk.

8 Claims, 4 Drawing Sheets

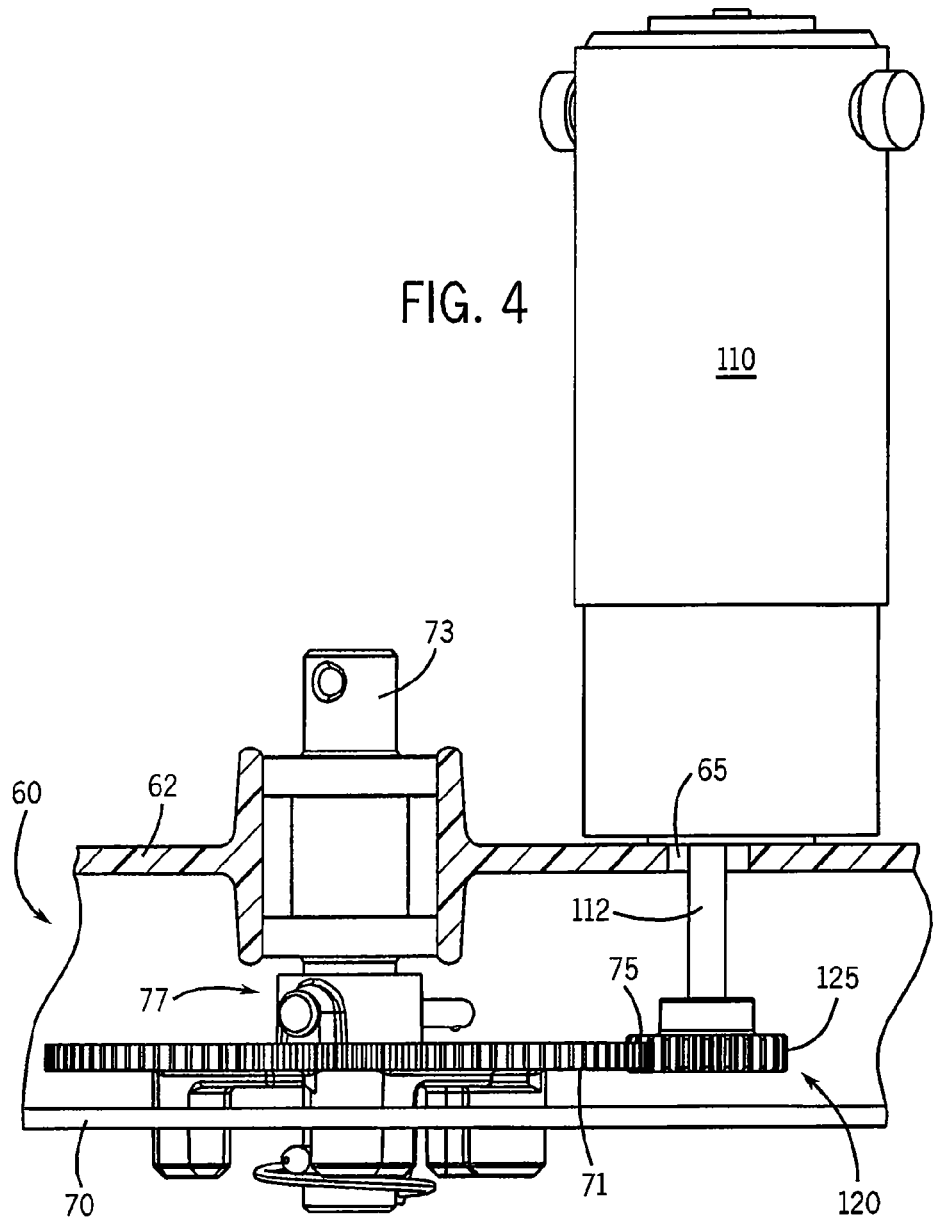

SEED PLANTER INCORPORATING DIRECTLY DRIVEN SEED METER HUB DRIVE

CROSS-REFERENCE TO RELATED APPLICATION

The present application is a divisional of application Ser. No. 12/625,218 filed Nov. 24, 2009 now U.S. Pat. No. 8,281,725.

BACKGROUND OF THE INVENTION

The invention relates generally to seed planters for dispensing individual seeds at a controlled rate into a seed furrow, and in particular, to a device and corresponding method for metering seeds at a desired rate.

Modern row crop planters or seed planters include multiple row planting units attached to a toolbar and towed behind a tractor. Each of the row planting units are responsible for opening a seed trench or furrow, dispensing the seeds into the furrow, then closing the furrow after the seeds are planted. The seed furrows are opened by a first pair of discs extending down from the planter at its leading end, closed by a second pair of discs extending down from the planter at its trailing end, and then tamped down by a trailing wheel which follows both disc pairs.

Typically, each row planting unit has its own seed hopper and seed metering system for dispensing the seeds at a controlled rate into the seed trench or furrow as the planter advances along the ground. The most common seed metering systems are vacuum-type meters that use vacuum force to draw air through multiple openings in a rotating seed disc, trapping individual seeds within each opening for delivery to a second location for their release to a seed placement device. The individual seeds are then delivered by the seed placement device, between the furrow opening disc and the furrow closing discs, into the open furrow at a controlled rate.

To perform the various seed metering operations, conventional row crop planters utilize a vacuum typically provided by a blower driven by a hydraulic motor attached to the hydraulic system of the tractor. However, the force required to rotate the seed disc is typically provided by a ground drive or a hydraulic drive. The ground drive, hydraulic drive, or other power source rotates a main, common driveshaft extending substantially the entire width of the row crop planter. The individual seed metering systems of the individual row planting units take power from this main driveshaft. The power is transmitted from the main driveshaft to the individual row planting units by way of chain or cable drives, driving a meter driveshaft, whereby the meter driveshaft serves as a power accepting jackshaft.

Typical meter driveshafts extend axially from, and concentrically drive, the seek disk. Some attempts have been previously made to improve the compactness of seed metering systems by moving the meter driveshaft from a concentric drive interface to a perimeter drive interface. Known perimeter drive systems still rely on a main driveshaft serving as a common power source for all the row planting units within a row crop planter. Although such previous perimeter drive units may improve compactness of seed metering systems to some extent, they fail to address numerous issues associated with operational uniformity of seed metering systems.

In modern farming practices, there is an increased reliance upon precision planting methods. Correspondingly, the integrity of modern seed metering system operations are closely related to system efficiency, consistency, accuracy, repeatability, and thus uniformity in placing seeds during use. Known seed metering systems, concentric drive and perimeter drive alike, face various performance uniformity issues related to the operation of conventional main, common driveshaft and meter driveshaft linkages. For example, the torque required to drive all of the seed metering systems by a common main driveshaft can be significant, since each seed metering system can experience high levels of friction during operation as, e.g. the vacuum force pulls the seek disk toward and into contact with the meter housing. As another example, non-uniform operation can result from non-desired rotational drive speed variations realized at the meter driveshaft as the chains and/or cables flex, relax, tighten, and slacken as the row crop planter traverses somewhat irregular field surfaces. Any of these and other operating characteristics can lead to erratic seed placement.

Additionally, typical seed planters do not have the ability to deactivate individual row planting units, independently of one another. This can lead to overseeding or overplanting, dispensing more seed than needed, during various instances in which portions of the seed planter passes over a segment of the field more than once. Such instances include those in which point rows are commonly utilized, such as while working fields having irregular shapes, or fields with trees or other obstacles therein. Other such instances include various field turn areas such as turn rows, headland rows, or end rows. Some efforts have been made to deactivate individual row planting units. However, such efforts require the use of complex assemblies, for example, pneumatic clutch assemblies with numerous parts and which can require relatively large amounts of energy to operate.

There is a need for a seed metering system that provides improved uniformity of seed placement during row crop planting. There is also a need for a seed metering system that reduces the number of moving parts and complex mechanical linkages in a seed planter. Furthermore, there is a need for seed planters which include multiple seed metering systems which can be activated and deactivated independently of each other so that individual row planting units can be engaged or disengaged independently as desired, whereby overplanting can be managed and minimized.

SUMMARY OF THE INVENTION

The present invention provides a direct drive electric seed metering system which meets the desires and needs described above, while being used, for example, in combination with a row crop planter or seed planter. In a first embodiment of the present invention, a direct drive mechanism for use with a seed metering system is provided. The seed metering system can be of the vacuum-type and can have a metering housing that encapsulates a seek disk. The seek disk is rotatable and is adapted to transfer individual seeds from one portion of the metering housing to another where they are discharged. In vacuum-type implementations of the seed metering systems, the seed transfer by the seek disk is aided by vacuum or negative pressure holding the seeds against the seek disk.

It is contemplated for the direct drive mechanism to be provided with a drive housing and prime mover attached to the drive housing. The drive housing is preferably attached to the metering housing. In such a configuration, the prime mover can drive an output gear that, in turn, drives the hub for the seed disc or plate to which the seek disk is mounted. As desired, the prime mover can be an electric motor, preferably a 12V DC electric motor. In some implementations, the output shaft of the prime mover can have a pinion gear mounted thereto, which directly drives the seek disk hub.

In still further implementations, the direct drive mechanism interfaces with the outer circumferential surface of the seek disk and selectively rotates it. Such an interfacing relationship can be realized between the hub of the seek disk and a pinion gear driven by the prime mover. Accordingly, the outer circumferential surface of the seek disk hub and the outer circumferential surface of the output gear have corresponding structures which facilitate the transfer of force therebetween. As one example, the outer circumferential surfaces can have spur gear teeth, interfacing and meshing with each other. As another example, the outer circumferential surfaces can have helical gear teeth interfacing and meshing with each other.

In yet a further implementation, the seed disc is mounted to a seed disc hub, which are collectively mounted to a shaft by a bearing assembly. The seed disc hub has an outer circumferential surface that is formed to interface with an output gear that is directly driven by motor drive shaft. In one example, the circumferential surface and the output gear have corresponding structures that interface with one another such that that rotation of the output gear causes rotation of the seed disc hub.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 4 illustrates a cross-sectional view of a portion of a direct drive electric seed metering system taken at line 4-4 in FIG. 2.

DETAILED DESCRIPTION OF THE INVENTION

Figure 1:
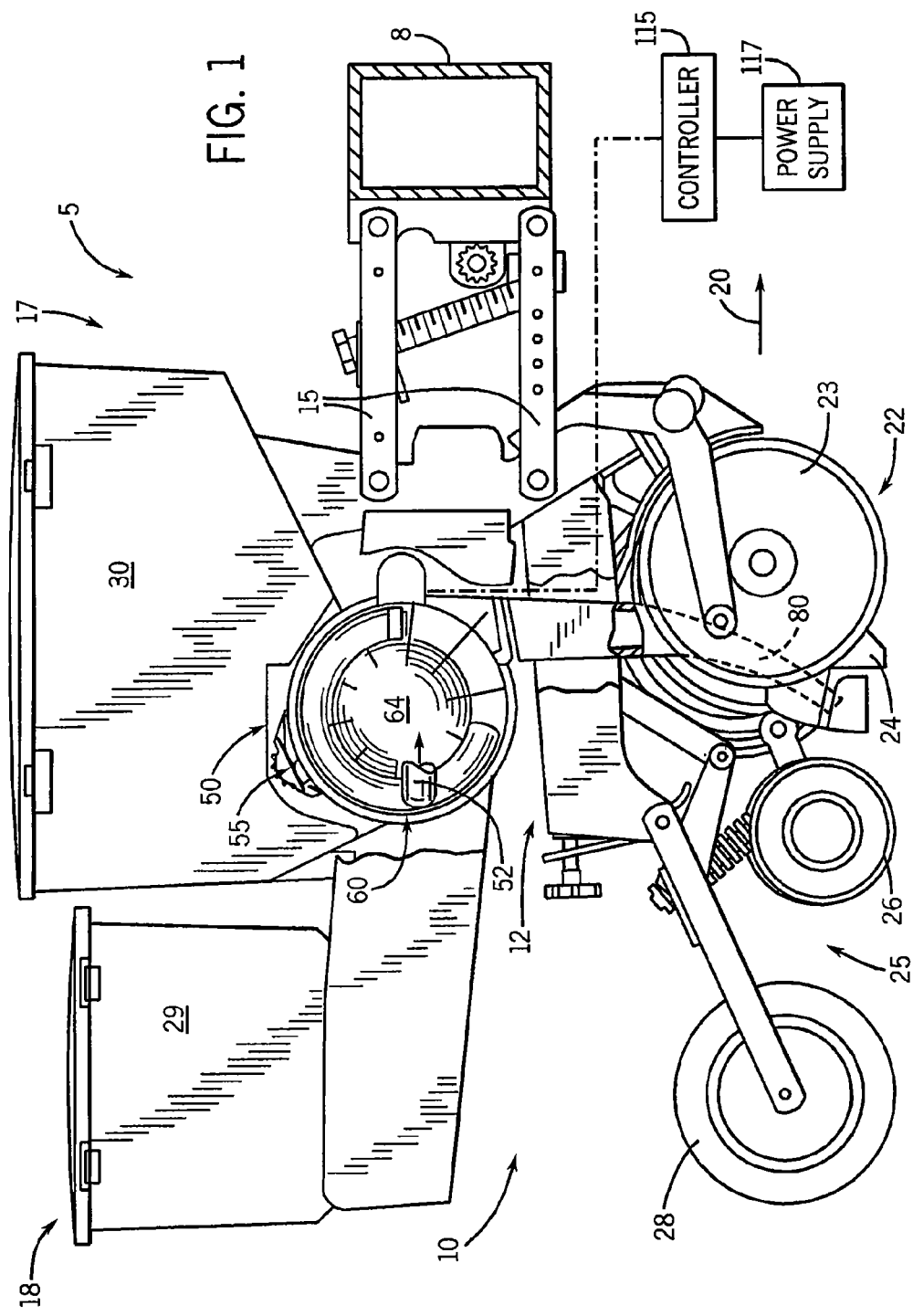
FIG. 1 illustrates a side elevational view of a portion of a seed planter incorporating a first embodiment of direct drive electric seed metering systems in accordance with the present invention.

Referring now to the drawings and specifically to FIG. 1, a portion of a multiple row crop planter implement or seed planter 5 is shown. The seed planter 5 is typically pulled by a tractor or other traction device (not shown). Seed planter 5 includes a toolbar 8 that holds multiple individual row planting units 10, each row planting unit 10 being substantially identical. Only a single row planting unit 10 is shown for simplicity.

Row planting unit 10 includes a frame 12 that attaches the unit 10 to toolbar 8 by way of parallel linkages 15. Row planting unit 10 has a leading end 17 which faces the direction of travel, indicated by arrow 20. A trailing end 18 faces the opposite direction, away from the direction of travel 20.

Frame 12 supports a furrow opening mechanism 22 near the leading end 17 of row planting unit 10, for cutting open the furrow to receive the deposited seeds. As is known in the art, the furrow opening mechanism 22 includes a pair of lateral spaced furrow opener discs 23, a furrow forming point, and an opener shoe 24. Optionally, the row planting unit 10 can include a runner-type opener for providing a furrow in the ground.

A furrow closing mechanism 25 is located at the opposing end of the planting unit 10, near trailing end 18. Closing mechanism 25 includes a pair of furrow closer discs 26 and a trailing wheel 28. The closer discs 26 are mounted in front of the trailing wheel 28, such that the two define a fore and aft aligned relationship relative each other. Correspondingly, after the closer discs 26 close the furrow, the trailing wheel 28 rolls over and tamps the furrow down.

In some implementations, an optional pesticide hopper 29 sits atop the frame, at the trailing end 18. Pesticide hopper 29 contains, e.g., an herbicide or an insecticide, and is provided with conventional dispensing means for applying controlled amounts of the contents in the desired locations while using seed planter 5.

Seed hopper 30 is mounted atop frame 12, as is optional herbicide or pesticide hopper 29. Seed hopper 30 holds the seed supply for planting by the row planting unit 10. The particular seed hopper 30 shown in FIG. 1 is adapted and configured to store the seed material and gravitationally deposit the seed material to the seed metering system 50, and ultimately to the ground as the seed planter 5 moves over and across the field. This procedure is explained in greater detail elsewhere herein. In other implementations, the seed supply is held in a primary seed hopper at a remote location, distant the various row planting units 10, whereby the seeds are supplied to the row planting units 10 pneumatically, or otherwise, through a seed conduit.

Figure 2:
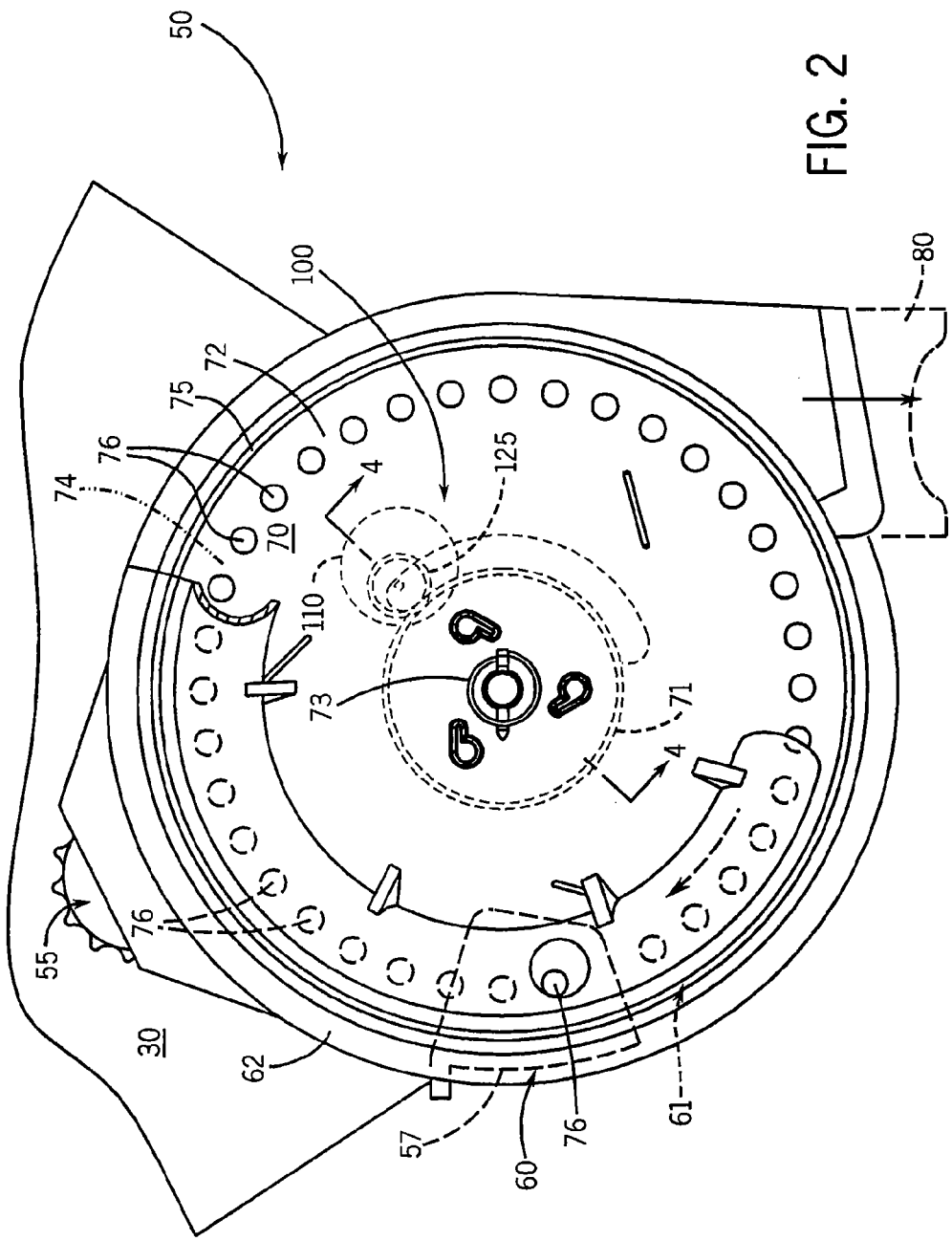
FIG. 2 illustrates a side elevational view of the direct drive electric seed metering system shown in FIG. 1, with the metering cover removed.

Regardless of the particular configuration of seed hopper 30, the seeds are directed from the seed hopper 30 to the seed metering system 50. As best seen in FIGS. 1-2, seed metering system 50 includes vacuum port 52, singulator assembly 55, seed inlet 57, meter housing 60, seek disk 70 seek disk hub 71, and direct drive mechanism 100. The seek disk 70 is mounted to the outer face of the seek disk hub 71 and rotates with the seek disk hub 71. Vacuum port 52 extends from the cover 64 and is connected to a vacuum source (not shown). Singulator assembly 55 is attached to the meter housing 60 and is adapted and configured to inhibit more than one seed from being discharged from the seed metering system 50 per seed discharge event. Seed inlet 57 is an elongated opening or conduit extending and directing seeds between the seed hopper 30 and meter housing 60. In such configuration, the seeds move by way of gravity from the seed hopper 30 through seed inlet 57 and into a reservoir or void space within the meter housing, such as meter cavity 61.

Meter housing 60 has a back portion 62 and a front or cover portion 64, which are preferably integrally formed with one another to define a meter cavity 61 therebetween. The meter cavity 61 houses the seek disk 70 therein. The seek disk hub 71 is mounted to an axle 73 by a pin (FIG. 4) and the axle is mounted in a conventional manner by a bearing assembly 77, and the axle extends into the housing 60. As seen in FIG. 1, vacuum port 52 extends outwardly from cover portion 64 of the housing 60 and as seen in FIG. 2, seed inlet 57 extends from backing portion 62 of the housing 60. In this configuration, it is apparent that the vacuum port 52 and seed inlet 57 are positioned on opposing sides of the seek disk 70. As desired, the vacuum port 52 and seed inlet 57 are at least partially registered with each other, on opposing sides of the seek disk 70. An opening 65 passes through the meter housing 60 permitting, e.g., portions or components of the direct drive mechanism 100 to extend into the meter cavity 61 and cooperate and interface with the seek disk hub 71.

The seek disk 70 is a flat, disc-like member, having opposing front and back surfaces 72 and 74, respectively. Seed pockets 76 are discrete openings that extend between front and back surfaces 72, 74, and thus through the entire thickness of the seek disk 70. The seed pockets 76 are equally spaced from each other and are radially spaced equidistant from an axis of rotation of the seek disk 70.

Seeds are guided, by the seed inlet 57, from seed hopper 30 to the meter cavity 61, generally into the space between the back surface 74 of seek disk 70 and the inwardly facing surface of back portion 62 of the housing 60. The seek disk 70 rotates in the meter cavity 61 as it is driven by the seek disk hub 71, whereby the seed pockets 76 pass across and interface the seeds which accumulate in the meter cavity 61. In vacuum-type implementations of the seed metering system 50, the vacuum or negative pressure is drawn through the vacuum port 52 and thus also through the seed pockets 76. In other words, vacuum or negative pressure is drawn from the beyond the front surface 72 which draws the seeds into the seed pockets 76, against the back surface 74 of seek disk 70. Regarding the particular vacuum-based methods and devices to apply negative pressure or vacuum to the seek pockets 76, any of the various conventional vacuum-based seed metering techniques will suffice.

The vacuum holds the seeds in the seed pockets 76 where they are rotatably transported in unison with the rotation of seek disk 70. As the seeds rotate with seek disk 70, and thus as they approach the discharge portion of the seed metering system 50, the seeds encounter the singulator assembly 55. Singulator assembly 55 is a conventional seed singulator device which insures that one and only one seed is present in each seed pocket 76 as each particular seed pocket 76 approaches the discharge area of the seed metering system 50, for dispensation through seed tube 80. The seeds that are delivered into seed tube 80 are deposited into the furrow, between the furrow opening and closing mechanisms 22 and 25, respectively. Seed tube 80 is a generally upright or vertical passage, which directs the seed to the ground or furrow for planting.

Figure 3:
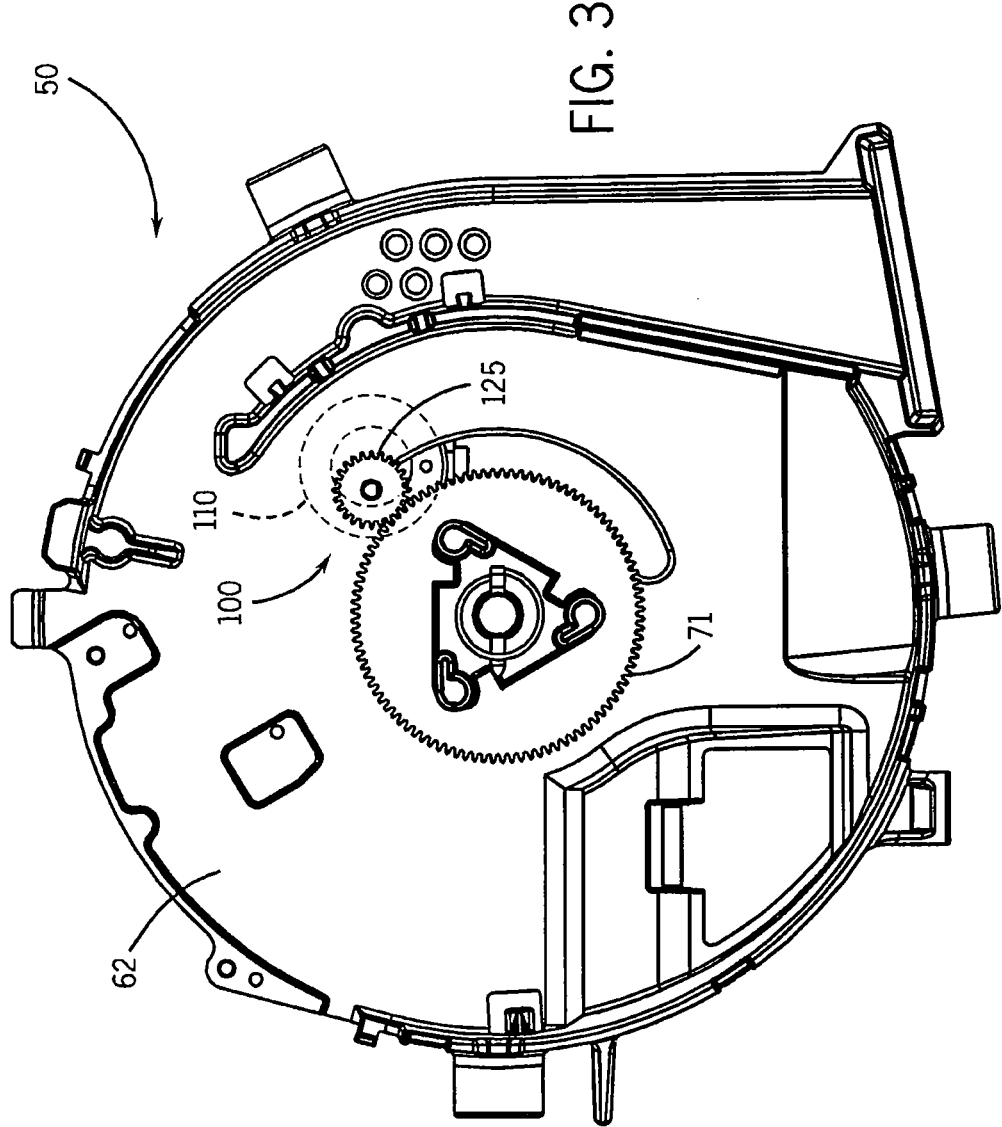
FIG. 3 illustrates a side elevation of the direct drive electric seed metering system, shown in FIG. 2, with the seek disk removed.

Turning now to FIGS. 3-4, seek disk 70 is rotated by way of its driven cooperation with the seek disk hub 71, which is in turn driven by the direct drive mechanism 100. Direct drive mechanism 100 selectively rotates or drives the seek disk hub 71 at a variable speed. The particular speed at which speed plate hub 71 is driven by the direct drive mechanism 100 is related, at least in part, to the ground speed or travel velocity of seed planter 5. The direct drive mechanism 100 includes prime mover 110 and a drive output assembly 120. Prime mover 110 is preferably an electric motor with an output shaft 112, and, more preferably, a 12V DC electric motor with an output shaft 112. The prime mover 110 is operably connected to a controller 115 and a power supply 117 (FIG. 1) which can be electrically connected to the 12V DC electrical system of the tractor. The controller 115 is further operably connected, in a conventional manner, to any of a variety of suitable sensors for sensing, e.g., travel velocity of the row crop planter 10, and/or other operating characteristics, which will be evaluated by the controller 115 in determining the desired rate of rotation of seek disk 70 by energizing direct drive mechanism 100.

In an alternate embodiment, the prime mover is a 3 phase motor. In yet another embodiment, the prime mover is a stepper motor. It is also contemplated that the prime mover could drive the seek disk hub 71 with a worm gear.

The particular configuration of drive output assembly 120 is selected based on the operating characteristics of prime mover 110 and seek disk hub 71. In preferred embodiments, drive output assembly 120 provides an output gear 125. The output gear 125 is mounted concentrically to the prime mover 110 output shaft 112 and it directly interfaces with and drives the geared outer circumferential surface 75 of seek disk hub 71. In a preferred implementation, the output gear 125 is a pinion gear.

In one preferred implementation, the prime mover 110 optimally functions at operational speeds of about 500-600 rpm. In this regard, the diameter (e.g., gear ratio) of the output gear 125 and the seek disk hub 71 are selected to mechanically step down the 500-600 rpm shaft speed of prime mover 110 to the desired 60 rpm maximum rotational speed of the seek disk hub 71, ensuring the desired rotational operation speeds of seek disk 70.

It will therefore be appreciated that the output gear 125 and the geared outer circumferential surface 75 of seek disk 71 are configured in a cooperating, force transmitting, preferably gear teeth meshing manner. Accordingly, outer circumferential surface 75 and the outer circumferential surface of output gear 125 can have cooperating, e.g., spur gear teeth, helical gear teeth, or suitable force transmitting configurations.

It is apparent that direct drive mechanism 100 eliminates, mitigates, or otherwise reduces the need for a typical main driveshaft, common to all row planting units 10 of the seed planter 5. Direct drive mechanism 100 further eliminates, mitigates, or otherwise reduces the need for any, e.g., meter driveshaft or jackshaft to drive the seek disk 70. This is because each row planting unit 10 has its own direct drive mechanism 100 attached directly thereto, and each direct drive mechanism 100 has its own prime mover 110. In this configuration, there is no need for a common source of mechanical energy to power the drive assemblies 100 through, e.g., chains, cables, or other mechanical linkages. Rather, the number of drive assemblies 100 and the number of prime movers 110 corresponds to, preferably are equivalent to, the number of row planting units 10 utilized by the seed planter 5.

In light of the above, during use, the desired seed type is received from the seed hopper 30, through the inlet 57, into the seed metering system 50. Simultaneously, furrow opening mechanism 22 opens a trough or furrow to receive seeds. Drive mechanism 100 rotates the seek disk 70 by energizing the prime mover 110, rotating its output shaft 112. The output shaft 112 rotates the output gear 125, which correspondingly rotates the seek disk hub 71. The teeth of output gear 125 mesh with and drive the corresponding teeth on the geared outer circumferential surface 75 of the seek disk hub 71.

Vacuum is applied from the front surface 72 of the seek disk 70, drawn through the seed pockets 76, thereby drawing seeds from the meter cavity 61 into the seed pockets 76. As desired, in some configurations, a positive pressure airflow can be provided toward the back surface 74 to enhance the transfer of seeds from the meter cavity 61 to the seed pockets 76. The seek disk continues to rotate which draws the seeds in the seed pockets 76 radially away from the mass of accumulated sees in the meter cavity 61. All but one seed per seed pocket 76 are removed by the singulator assembly 55, and each such single seed is ultimately discharged from the system 50 through seed tube 80 into the furrow. As the seed planter 5 advances further, the furrow closing mechanism 25 closes the furrow with the seeds therein and the trailing wheel 28 tamps down the closed furrow.

All the while, the controller 115 (FIG. 1) monitors the ground speed or travel speed of the seed planter 5, the rotational velocity of the seek disk 70 or the seed depositing rate from seed metering system 50, and, as required, adjusts or regulates the operating characteristics of the seed metering system 50 to suitably correspond to the ground speed. It will be appreciated that the ground speed of the seed planter 5 can be determined in a sensor mounted to a gauge wheel (now shown) of the planter 5. The ground speed could also be measured using GPS technology or other known techniques. The desired instantaneous seed depositing rate measured by seed sensor (not shown) on seed tube 80 is a function of the travel velocity of the seed planter 5 at that instant, whereby such desired depositing rate can be predicted and sought by the controller. Accordingly, the seed metering system 50 is selectively driven by drive assembly 100, preferably at a variable rate and, more preferably, at an infinitely variable rate, based at least in part on the ground speed or travel velocity of seed planter 5. It is further contemplated that a sensor (not shown) may be disposed in each housing 60 that provides feedback to the controller 115 regarding the rotational speed of the output gear 125, the seek disk hub 71, or both.

Furthermore, preferred implementations include a single controller 115 which controls all of the drive assemblies 100, and thus, the operating characteristics of all of the seed metering systems 50. Doing so can ensure that each drive assembly 100 receives the same control signals, whereby the resultant output responses of the assemblies 100 should be substantially analogous, when that is desired. This can enhance uniformity of seed placement between the individual rows and other operating characteristics.

However, controller 115 can also control the individual drive assemblies 100 independently of each other, optionally each row planting unit has its own controller 115. In such configuration, the row planting units 10 can be activated and deactivated independently of each other, whereby overplanting can be managed and minimized. Accordingly, when using row crop planting techniques such as, e.g., planting point rows, turn rows, headland rows, or end rows, or in other situations which could lead to double planting or other overplanting conditions, the precision planting system can automatically de-energize and thus disengage any one or more of the individual row planting units as desired. This enables the user to comprehensively manage the application of seed, on a per row planting unit and thus per row basis. Moreover, since each row has its own controller, the user can apply seed at different population rates on each individual row, as desired. This can be particularly beneficial to growers that grow seed corn for the industry and are planting different varieties, or "male only" seeds, or otherwise desire different population rates in the individual row planting units 10 on the planter 5.

It will be appreciated that the present invention provides a number of advantages over seed metering systems that drive the seed disk directly. For example, the seed disk hub of the present invention has a thicker profile than the seed disk. This thicker profile provides gear teeth having a wider surface area and thus reduces the wear on the gear teeth. Additionally, for those disks that are directly driven, it is necessary to cut gear teeth into the seed disks. Thus, to retrofit an existing seeder, it is necessary to replace the existing seed disk with a disk having gear teeth. Since each crop type typically requires its own seed disk, the replacement costs can be quite high. The present invention is usable with conventional seed disks and thus retrofitting can be accomplished at far less a cost. Also, when the seed disk, as opposed to the seed disk hub, engages the drive gear, it is necessary to disengage the gear drive from its engagement with the seed disk to replace or service the seed disk. In contrast, the present invention allows the seed disk to be detached from the seed disk hub and a new seed disk mounted to the hub without disengaging the hub from the gear drive.

While the invention has been shown and described with respect to particular embodiments, it is understood that alternatives and modifications are possible and are contemplated as being within the scope of the present invention. A wide variety of ground-engaging implements (e.g., conventional seeders, seed planters, and row crop planters) can employ the direct drive electric seed metering system 50 of the present invention. In addition, it should be understood that the number of direct drive electric seed metering systems 50 employed on the row crop planter or seed planter 5 is not limiting on the invention.

Many changes and modifications could be made to the invention without departing from the spirit thereof. The scope of these changes will become apparent from the appended claims.

We claim:

1. A seed planter, comprising:
   a toolbar generally defining a width dimension of the planter and configured to be coupled to a towing vehicle;
   a plurality of row planting units mounted to the toolbar, laterally spaced from each other, and each having a seed metering system, wherein each seed metering system includes a seed disc that meters a volume of seed and a seed disc hub to which the seed disc is mounted; the seed disc hub having a geared outer circumferential surface; the seed disc housed in a metering housing. and interconnected to the seed disc hub for rotational movement therewith, the seed disc having first and second surfaces and a of seed sockets therebetween; and
   a plurality of direct drive mechanisms, each direct drive mechanism directly driving a corresponding seed metering systems, and wherein each direct drive mechanism includes a prime mover having an output shaft that drives an output gear in direct engagement with the seed disc hub to cause rotation of the seed disc and configured to interface with the geared outer circumferential surface of the seed disk hub.

2. The seed planter of claim 1, wherein each prime mover is an electric motor.

3. The seed planter of claim 2, wherein each electric motor is a variable speed electric motor.

4. The seed planter of claim 1, wherein each metering system has a metering housing and each direct drive mechanism has a drive housing, respective metering and drive housings being connected to each other.

5. The seed planter of claim 4, wherein each of the output gears is a pinion gear.

6. The seed planter of claim 4, wherein the seed metering systems are vacuum systems.

7. The seed planter of claim 4, further comprising a sensor disposed in each of the metering housings, and each sensor is operative to provide feedback regarding a rotational speed of a respective output gear.

8. The seed planter of claim 1, wherein the prime mover has an output shaft that is rotated at a variable speed, and the output gear provides a speed reduction such that the seed disc hub is caused to selectively rotate at a rotational speed between 0 and 60 r.p.m.

* * * * *